Jan. 8, 1946. E. A. STALKER 2,392,419
AIRCRAFT
Filed June 30, 1943
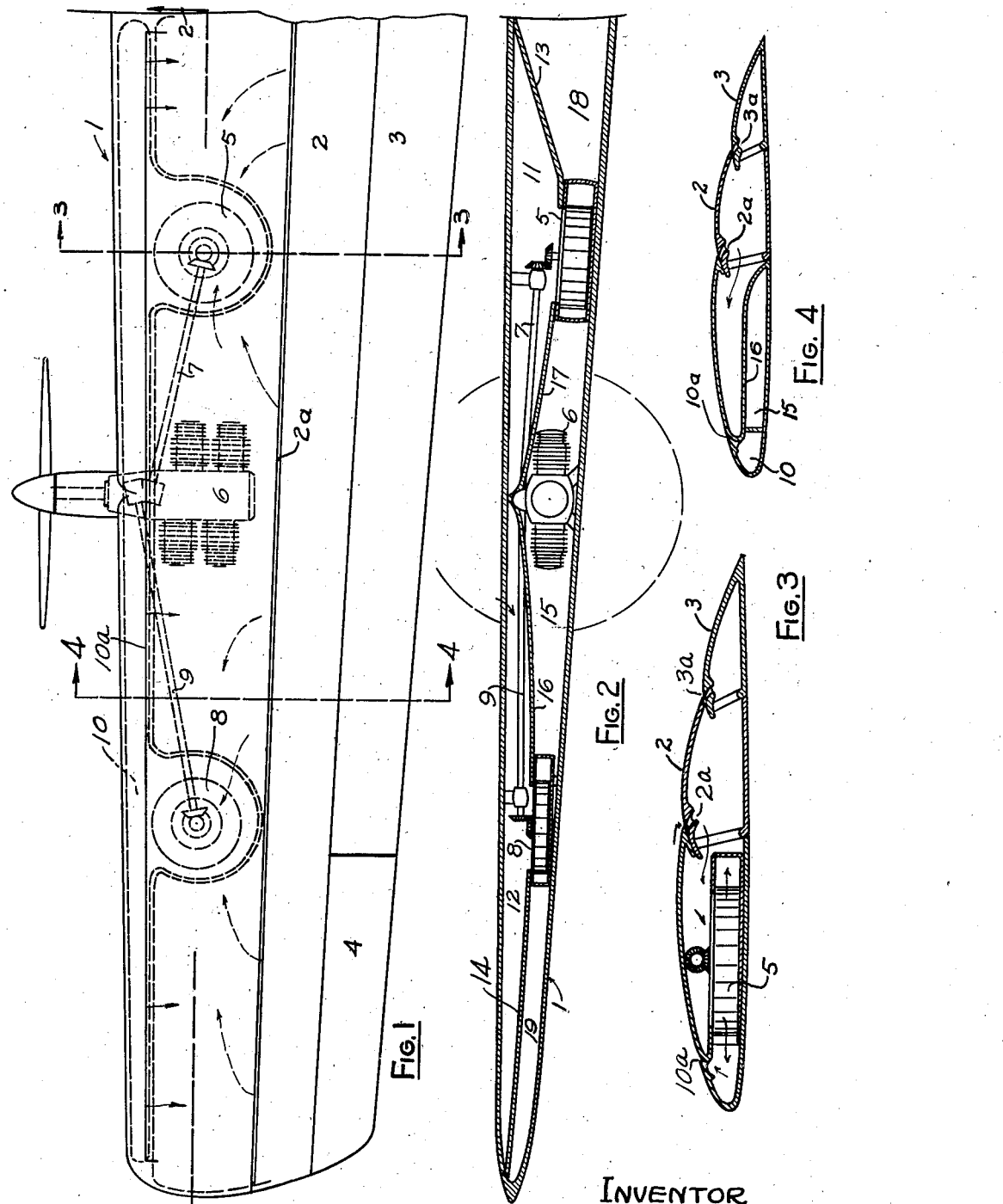
INVENTOR
Edward A. Stalker
By Marechal and Biebel
ATTORNEYS Patented Jan. 8, 1946

2,392,419

UNITED STATES PATENT OFFICE 2,392,419

AIRCRAFT

Edward A. Stalker, Bay City, Mich.

Application June 30, 1943, Serial No. 492,877

4 Claims. (Cl. 244—40)

My invention relates to aircraft and more particularly to wings therefor.

It is the principal object of the invention to provide a wing structure having slots and arranged for a flow of air through the slot and the wing interior without objectionable loss or excessive resistance and which is also so arranged as to afford adequate space in the wing for locating the engine, or to be used for receiving fuel, ammunition, guns or the like.

It is also an object to provide such a wing structure having provision for boundary layer control in which the air flow passages are economically and compactly arranged within the wing interior and segregated from the engine and other spaces leaving adequate volume in such spaces for any desired utilization.

I accomplish the above objects by the means illustrated in the accompanying drawing in which—

Fig. 1 is a fragmentary plan view of a wing constructed in accordance with my invention;

Fig. 2 is a spanwise vertical section along the line 2—2 of Fig. 1;

Fig. 3 is a chordwise vertical section along the line 3—3 of Fig. 1; and

Fig. 4 is a similar section along the line 4—4 of Fig. 1.

The present invention has to do with wings having slots therein with blower or other means for producing a flow of air through the slots and the interior of the wing. Such flow may be either discharged or inducted through the slot, and may be used for obtaining a jet reaction for control purposes, or for the purposes of boundary layer control. In accordance with the present invention the interior of the wing is compactly and conveniently arranged so as to facilitate such flow of air through the wing interior without objectionable drag or obstruction and at the same time to make proper and adequate provision for the use of the wing interior space in any of the usual or desired manners. In this way the provision of the boundary layer control with the resulting increase in the lift of the wings does not give rise to an objection of robbing the wing of the space required for the engine, fuel tanks, ammunition, guns, or the like.

Referring to the drawing which discloses a preferred embodiment of the invention, the wing is shown at 1 equipped with the flaps 2 and 3 arranged in tandem and adapted to be operated by suitable controls. The flaps have the slots 2a and 3a as shown in Fig. 3 which are fully exposed when the flaps are depressed. There is also the flap or aileron 4.

The boundary layer is inducted through the slots 2a and 3a by the blowers 5 and 8 driven from the engine 6 by means of shafts 7 and 9 and suitable gearing. The blowers discharge into the forward compartment 10 and out the discharge slot 10a, located on the forward part of the upper wing surface.

The flow compartments 11 and 12 for boundary layer control are divided off or segregated from the remainder of the wing by the laterally extending partitions 13, 14, 16 and 17. These partitions extend from the forward duct 10 rearward over approximately the entire wing span to the trailing end of the wing main body where they are closed against the lower surface of the wing. The compartments below the partitions are thus segregated and free access is provided for the forward flow of air inducted through the slots. On their opposite sides they form with the lower wall of the wing the storage compartments 15, 18 and 19.

The blowers 5 and 8 are arranged on each side of the engine 6 and the walls 16 and 17 are inclined upward toward the engine from the opposite sides thereof to progressively reduce the cross section of the compartments serving the slots. Thus a space of maximum depth is provided for the engine and the cross section of the flow passage from the slot 2a to the blower increases in size toward the blower as is desirable to accommodate the increasing volume of the flow. This variation of the cross section is desirable to distribute the suction properly along the slot length and to keep the velocity of flow within the wing at a fairly uniform value at all cross sections, contributing to a minimum of fluid frictional loss within the wing.

The walls 13 and 14 also slope away from the blower inlets so as to control the suction flow in the efficient manner just described. This provides below the wall 13 the compartment 18 which is desirably located for fuel or guns.

On either side of the engine there is also adequate space for fuel or machine guns. The particular service of the airplane and the significance of the fire hazard would determine the choice of the space. Where it would be desirable to locate the gasoline supply a considerable distance from the engine and its hot exhaust parts the compartment 18 would be most desirable for fuel and the compartments 15 and 19 most desirable for machine guns, the arrangement as herein described affording substantial flexibility of design.

The tapered passage arrangement is also the most desirable for discharge slots in which case the exit of the blower would be put in communication with the slot.

To recapitulate, the blowers and engine are so related that compartments of tapering cross section are joined on opposite sides of the walls forming the compartments with the remainder of the wing structure. This provides the most favorable division of the space to serve the boundary layer control of the wing and the storage of such materials as fuel, guns, and power plants.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination, a hollow wing structure having a spanwise extending slot in its surface leading into the wing interior, engine means supported on the wing, blower means on each side of said engine means within the wing and in communication with said slot, means to drive each said blower means from said engine means, and walls defining with a portion of said wing structure passages in communication with said slot, each said passage tapering in cross section from said blower toward a point above said engine means to distribute the air flow and to accommodate the increasing volume of flow properly along said passage and to provide spaces within the wing on the opposite side of said walls of adequate dimensions for housing said engine means and the like.

2. In combination, a hollow wing structure having a spanwise extending slot in its surface leading into the wing interior, an engine supported on the wing, blower means on each side of said engine within the wing and in communication with said slot, means to drive each said blower means from said engine, and sloping walls extending away from said engine at either side thereof toward said blowers defining with a portion of said wing structure passages in communication with said slot, each said passage tapering in cross section from said blower toward a point above said engine to distribute the air flow and to accommodate the increasing volume of flow properly along said passage and to provide spaces within the wing on the opposite side of said walls of adequate dimensions for housing said engine and the like.

3. In combination, a hollow wing structure having a slot in its surface extending over a substantial portion of the wing span and leading into the wing interior, an engine supported on the wing, blower means on each side of said engine within the wing, means to drive each said blower means from said engine, and intermediate walls between the upper and lower wing surfaces extending laterally over a major portion of the wing area defining with a portion of said wing structure passages in communication with said slot, each said passage tapering in cross section from said blower toward a point above said engine to distribute the air flow and to accommodate the increasing volume of flow properly along said passage and to provide spaces within the wing on the opposite side of said walls of adequate dimensions for housing said engine and the like.

4. In combination, a hollow wing structure having a wing main body, an adjustable flap at the end of said wing main body, said flap having a spanwise extending slot in its surface leading into the wing interior, an engine supported on the wing, blower means on each side of said engine within the wing, means to drive each said blower means from said engine, means forming a forward discharge duct adjacent the leading edge of the wing for receiving the discharge from said blower means, and walls extending from said discharge duct rearwardly to substantially the end of said wing main body defining passages in open communication with said flap to transmit the flow passing through said slot, each said passage tapering in cross section from said blower toward a point above said engine to distribute the blower action and to accommodate the increasing volume of flow properly along said passage and to provide spaces within the wing on the opposite side of said walls of adequate dimensions for housing said engine and the like.

EDWARD A. STALKER.